Jan. 3, 1928.

F. C. MERRIELL 1,655,323

VEHICLE SPRING MECHANISM

Filed June 3, 1924

Inventor
F. C. Merriell
By Edward E. Clement
Attorney

Patented Jan. 3, 1928.

1,655,323

UNITED STATES PATENT OFFICE.

FRANK C. MERRIELL, OF FRUITA, COLORADO.

VEHICLE SPRING MECHANISM.

Application filed June 3, 1924. Serial No. 717,518.

My invention relates to improvements in spring mechanism for vehicles. It has for its objects the provision of means whereby the riding qualities of vehicles, more particularly pleasure automobiles, are improved; the road shocks being absorbed and the starting and stopping motion being transmitted to the body of the car with the maximum smoothness, the said means at the same time so constructed as to withstand any extraordinary shock or strain. As my description progresses other objects and improvements will be apparent.

I attain my objects by providing a straight cantilever spring anchored to the chassis at two points, one point at the rear end of the spring and a second point located centrally thereon, the spring extending forward and the axle being attached to its forward end in such manner that the spring transmits the stress required to move the body of the car, from the rear axle, as tension, and is at all times in the best condition to absorb road shocks.

Figure 1:
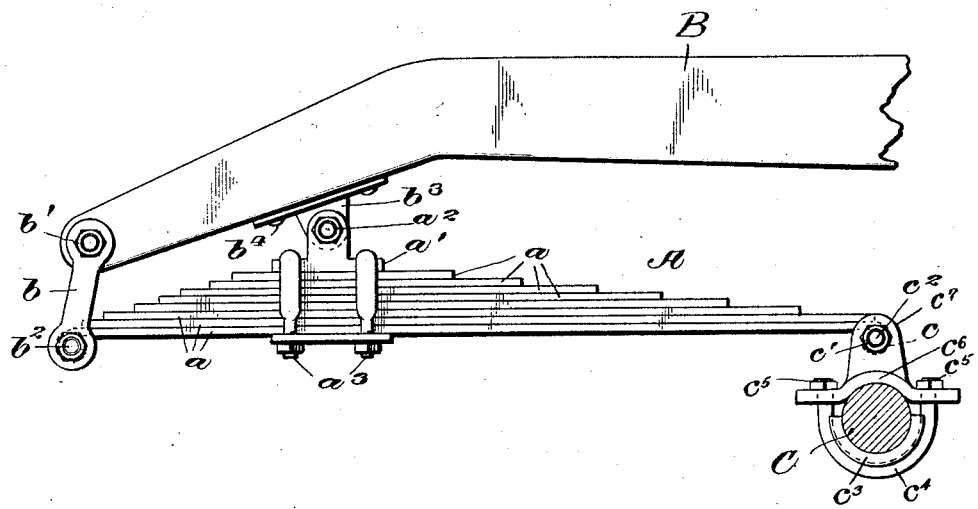
Fig. 1 represents a side elevation of the spring and a portion of the frame of the vehicle.
Figure 2:
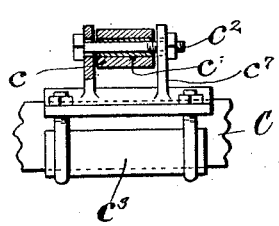
Fig. 2 is a detailed side view showing partly in section the rear axle fitting which is shown in end view of Fig. 1.

Referring in detail to the drawing, A is a straight cantilever spring composed of a plurality of leaves $a$. B is the rear end of the frame of the vehicle, the spring A being attached thereto at its end by shackle link $b$, by means of pivot bolts $b^1$ and $b^2$; the end of the longest or lower main leaf being provided with an eye for the said lower bolt $b^2$. The rear end is by these means made semi-rigid thereby permitting movement either laterally or in rotation. The spring is anchored again to the frame, at a point intermediate of its ends, by means of the bracket $b^3$ which is attached to the frame by the rivets $b^4$, to which the saddle $a'$ is attached by means of the pivot bolt $a^2$, said saddle being clamped to the spring leaves $a$ by the clips $a^3$. C is the rear axle housing which is attached to the end of the spring, said end being provided with the eye $c$ into which the bushing $c'$ is fitted and the pivot $c^2$ connects the eye of the spring to the housing through said bushing. This is illustrated in Fig. 2, wherein the axle housing C is enclosed by a split sleeve composed of members $c^3$ and $c^6$, clamped together by means of the U-shaped bolts $c^4$, receiving at their upper ends the nuts $c^5$ which rest on horizontal flanges carried by the upper clamping member $c^6$. The friction on the axle housing can be made anything desired by adjusting the nuts $c^5$. Integral with and extending from the member $c^6$ are two cheek plates $c^7$ (see Figs. 1 and 2), which receive between them the eye $c$ of the spring A. It is to be observed that while the entire assemblage of saddle and sleeve may be set up on the axle housing so tightly that it will not turn thereon, yet it may also be adjusted so as to permit a certain amount of rotary motion around the axle housing.

In operation the first part of a vehicle to move when the clutch is engaged is the rear axle, from which motion is transmitted to the body of the car by the spring or by auxiliary devices, such as torque or pull rods or guyed third members. Such methods are used in actual practice, effecting transmission by combinations of the springs and the other members. Without help of these other devices the smoothness of riding is very much decreased; and the effect of the usual type of spring, running forward from the axle to the body, whether the spring be semi-elliptic or cantilever, is to throw the spring or that part of it which is rigidly attached to the body into compression, for the purpose of carrying the thrust to the body and giving motion. The condition of being under compression, and in effect acting as a column, is one for which neither the spring steel nor the form of the spring is primarily designed. If the connecting leaf takes the strain by itself its spring action is practically nullified and it is rendered very liable to break. On the other hand, if the compression is communicated also to the other leaves, then all are hindered in their spring action and are prevented from being properly resilient. In applicant's device these objections are avoided and the spring transmits the stress required to move the body of the car as tension in such manner that it does not interfere with the spring action of any of the leaves in any manner. This is a primary advantage of applicant's device and is believed to be new in its specific construction and will be claimed as such.

Figure 3:
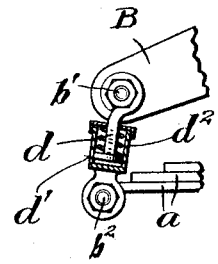
Fig. 3 is a detailed side view partly in section of a spring shackle for the rear end of the spring, the same being a modification of the shackle shown in Fig. 1.

The manner of attaching the spring at the rear end may be by means of a spring shackle link instead of the ordinary solid shackle link. This construction will give the effect of a shock absorber at the same time serving its purpose of securely attaching the end of the spring, and is also thought to be an improvement over any methods heretofore used for the same purpose in the prior art. This is shown in Fig. 3, in which the link $b$ is replaced by a spring tension link, composed of a central stem $d$ working in a barrel $d'$, with a spring $d^2$ compressed between the head of the stem $d$ and the head of the barrel $d'$. This spring shackle or clip is secured to the parts B and $a$ by bolts $b'$ and $b^2$ as in Fig. 1. When the spring leaves are suddenly compressed by the rising of the axle C, and then suddenly opened by the rebound, the effect will be first to compress the spring $d^2$ and then for the spring to exert pressure on the leaves $a$ of the main vehicle spring and draw the same upward so as to prevent violent rebound and maintain continuous transmission of strains from the body member B to the axle C.

As is commonly known the smoothness of riding of a vehicle is directly influenced by the wheel base, and more particularly is affected by the distance between the points at which the body is supported, the greater the length the greater the smoothness of riding. An additional improved result by use of applicant's spring will be noticed in that with applicant's construction the effective wheel base is the same as the length of the frame, since the point of support for the rear end is the place where the spring is rigidly attached to the body, while in front because of this type of spring the rigid front half of the spring is added to the wheel base.

It is further pointed out that while, as is done in no other type of spring, applicant's construction puts the spring in pure tension only, in carrying the driving stress from the rear axle to the body, the spring acts practically as its own rebound check owing to the semi-rigid middle support. That is, during rebound, when the front ends of the leaves tend to separate, the rear ends tend, from being pressed together, to force the body back to the normal position, thereby effecting a reversal of stress at the middle clamp. The facts that the middle point and rear end are only semi-rigid prove in practice to also aid greatly in producing steady riding.

While I have thus specifically described my invention it is to be understood that I claim as original with me and a part thereof all such modifications in construction and arrangment as fall fairly within the scope of the appended claim.

Having thus described my invention what I claim and desire to secure by Letters Patent is:

The combination with a vehicle frame of a rigid member extending horizontally therefrom and having its end bent downwardly at an obtuse angle, and a straight cantilever spring lying directly beneath said member, with its outer end adjacent and connected to the outer end of said member by a shackle with pivot bolts, having its inner end connected by a pivot clamp to the axle of the vehicle, and at a point intermediate of its ends but nearer to the outer end and beneath the downwardly bent portion of the frame member, having a pivotal connection therewith, composed of two members, one fixed rigidly to the inclined end part of the frame member, and the other clamped to the body of the spring, whereby vertical movements of the axle with relation to the frame of the vehicle, will produce flexions from end to end of the spring, reversed at the intermediate pivotal connection, while by reason of the pivots, the spring is free to move longitudinally as well as vertically in the said flexions, whereby perfect absorption of thrust strains as well as road vibrations is produced, the drop or amount of downward bend in said frame member being inversely proportional to the strength of the spring, to permit free vertical travel of the axle during the flexions thereof.

In testimony whereof I hereunto affix my signature.

FRANK C. MERRIELL.